Patented Jan. 2, 1940

2,185,332

UNITED STATES PATENT OFFICE 2,185,332

REFRIGERATION

David Crampton, Montclair, N. J.

No Drawing. Application October 27, 1938,
Serial No. 237,273

8 Claims. (Cl. 252—5)

This invention relates to improvements in refrigerants for refrigerating systems of both the mechanical and absorption type. Refrigerants heretofore known contained small amounts of water and also acid, the acid being present largely as the result of chemical breakdown of the refrigerant.

The principal object of the present invention is to provide a reagent which may be added to the usual refrigerant to dehydrate the same and maintain it in dehydrated condition, and also to neutralize any acid which it may contain initially or develop during use.

The invention also includes the completed mixture of refrigerant and the dehydrating and acid-neutralizing reagent.

The treating agents to be described are valuable for use with hydrocarbon refrigerants, such as propane or isobutane, and hydrocarbon derivatives, particularly the halogen derivatives such as methyl chloride, dichlorodifluoromethane, methylene chloride, ethyl chloride and others.

One object of this invention is to provide a dehydrating agent which is fluid and which will easily and quickly mix with the refrigerant and circulate throughout the entire refrigerating system with it, searching out moisture and acid wherever they may be, and thus correcting or preventing the usual operating difficulties due to moisture and/or acid.

Another object is to provide a dehydrating agent which is active enough chemically to remove all but traces of water when added to the refrigerant in quantities which are much smaller than required with other materials.

Another object is to provide a fluid dehydrating and neutralizing agent which is miscible with oil and refrigerant, and which will circulate with it throughout the system and thus reach moisture and acid wherever they may be.

Also, this invention provides a method for adding dehydrating, neutralizing, and stabilizing agents to refrigeration systems which do not require the use of expensive additional equipment such as cannisters, cartridges, filters and the like.

For satisfactory operation, refrigerating systems containing hydrocarbons, propane, isobutane, methyl chloride, dichlorodifluoromethane, methylene chloride and other halogen substituted hydrocarbon refrigerants, must be dry. Tests have shown as little as .02% water can cause corrosion and frozen expansion valves. Although in practice every attempt to keep water out is made, it may enter and cause trouble. Faulty factory dehydration, wet oil or refrigerant, humid weather when installing, etc., are a few sources of moisture, and there are many others.

In a similar way, acid may be introduced and in addition water may promote hydrolysis of halogen refrigerants forming halogen acids. Most refrigerating equipment subject to water and/or acid internally will eventually give trouble due to freeze ups, corroded valves, seals, expansion valve needles and other parts, gum and sludge formation in the oil, and so-called "copper plating," etc.

I have discovered that metallic alcoholates are satisfactory agents to add to refrigerants and refrigerating systems to accomplish the dehydration of the system and the neutralization of any acid which may be present. To advantage, the alcoholates are those of the alkali earth metals, or better still of the alkali metals. These compounds are most conveniently added in the form of solution, an alcohol being especially suitable for this purpose as alcohols generally are miscible with both the ordinary refrigerants and also water. Such a solution may be obtained by dissolving 300 grams of metallic sodium in 10,000 grams of anhydrous synthetic methyl alcohol, giving a solution containing about 3% metallic sodium or about 7½% sodium methylate. Such a solution dehydrates by chemical elimination of water according to the following reaction:

$$CH_3ONa + H_2O \rightarrow CH_3OH + NaOH$$

As a result, not only is the reagent as added completely anhydrous, but it also remains so until the greater part at least of the methylate has been converted into alcohol and caustic soda.

When a methylate solution of the above mentioned strength is added to the refrigerant in a system in the proportion of about ½–1% by weight, I find it satisfactorily removes acid and dehydrates the system. The foregoing quantity is suitable when the moisture to be encountered is small. Larger amounts of moisture will require stronger solutions or more solution, or both.

To cure a frozen expansion valve or float valve, I add to the system the proper amount of alcoholate solution. The solution is preferably placed in the liquid line or in the receiver. As soon as the valve warms up enough to let the slightest amount of liquid through, my solution reaches the iced part, loosens and dissolves the ice and reacts with it, and the system is then free of moisture, and the valve becomes operable.

Methyl alcohol alone, of course, will produce somewhat the same effect. The difference is, however, that methyl alcohol, when used alone, merely makes an antifreeze solution with the water and allows it to remain where it may cause corrosion, especially when free caustic alkali is not present.

To prevent moisture trouble, I prefer to add my solution to the refrigerating system at the time the installation is made, or to add it to the condensing unit or other normally sealed part of the system in the factory, so that if moisture enters upon installation at a later date, the unit has a corresponding dehydrating capacity for counteracting it. Still a third way is to add alcoholates or their solutions to the refrigerant before introduction into a refrigerating system, or to the glycerin or other lubricant prior to use. If the reagent is added to the lubricant there is a transfer of a part of the reagent to the refrigerant. Conversely, when the reagent is added to the refrigerant there is a transfer of a part of the reagent to the lubricant, especially where a blending agent is used which renders the reagent soluble in both refrigerant and lubricant.

The principal function of the solvent for the alcoholate, such as methyl alcohol, is to make the alcoholate soluble in the refrigerant. For this reason other neutral solvents than alcohol may be used, if desired. From this aspect, my invention may be stated to consist in the use of a solution of an alkaline hygroscopic material in a solvent miscible with the refrigerant.

As the chief active agent in my solution is the alcoholate, not the alcohol, the alcoholate may be used alone if desired. In view, however, of the slight solubility of such compounds as sodium methylate in the refrigerants ordinarily used, I prefer to use such compounds in conjunction with blending agents or solvents capable of materially increasing the solubility of such compounds in the refrigerant.

The advantages of my solution are apparent when it is compared with conventional dehydrating means. For example, my solution acts much faster than the previously known cartridge drier, because it can circulate with the refrigerant and reach all parts of the system almost at once. A cartridge drier has a fixed location; it cannot remove water unless the water is brought to it. Water frequently is trapped in some location where only a fluid agent will reach it. Many parts of refrigerating apparatus, such as walls and valves of the compressor are normally only contacted by refrigerant vapor. Agents such as calcium oxide, calcium chloride, activated alumina, etcetera cannot reach these surfaces. I have found that alcoholates in suitable solvents and blending agents do reach these surfaces. In the parts of the refrigerating system where the refrigerant exists as a vapor, solvents like methyl and butyl alcohol, which are less volatile, move along as small droplets, carrying the alcoholates in solution. Lubricants travel in a similar manner with vaporized refrigerant, and the alcoholates may also be found partly blended with the oil films and oil droplets. Also, as a cartridge drier removes water, it has to extract water from increasingly dilute mixtures. This requires large, expensive amounts of drier material in order to promote dehydration by the influence of mass action.

Many conventional driers operate on an adsorption principle and the agents used have a definite physical equilibrium between water absorbed and water remaining in the refrigerating system. Frequently, these equilibria are unfavorable and large amounts of drying material are needed to reduce the water to sufficiently low concentration in the refrigeration system. Solid drying materials depending on surface phenomena for removal of water can become oil or dirt logged, while the alcoholates dissolved in alcohol and/or refrigerant are not so affected.

The methods by which refrigerating systems have heretofore been dried have involved the use of various agents, among them calcium oxide, calcium chloride, activated alumina, silica gel, calcium sulphate. The three last are neutral to the refrigerants normally used but remove water only slowly. By actual test on a ½ H. P. methyl chloride water cooling system containing about 2,000 grams of refrigerant, the addition of .05% of water caused the expansion valve to freeze up even with an activated alumina cartridge drier in the liquid line. The addition of 20 cc. of methylate solution to the same system, except for the absence of the cartridge drier prevented freezing entirely. Experience with an activated alumina drier has shown that when 0.05% of water is added to the refrigerant it is possible to remove the moisture down to a point where freezing would no longer occur, only by continuously allowing the expansion valve to warm up after each freezing, and thus keeping the refrigerant circulating. This took several days and required application of warm rags to the expansion valve whenever it froze up, which it did many times during the drying process. The methylate solution cured the trouble upon its first addition, thereby illustrating the speed with which it searches out and removes water and acid from the field of action.

All solid drying agents not soluble in the refrigerant used require cartridges with retaining screens and filters which are expensive. Most of them tend to dust when absorbing water. If the screens fail, this powder circulates through the system acting as an abrasive and tending to clog ports and orifices. Calcium oxide is particularly bad, since it can form particles too small for any filter to hold. If solid sodium alcoholates are used in cartridge form instead of alcoholic solutions thereof, this objection does not arise because the products resulting from the absorption of water are not a dust, but a solution of caustic soda in alcohol.

None of the usual drying agents will appreciably neutralize acid except calcium oxide. It is very important to remove the acid, and it has been found that methylate has some advantage over calcium oxide for when it reacts with acid alone, it neutralizes it but does not form water:

$$CH_3ONa + HCl \rightarrow CH_3OH + NaCl$$

The small amounts of sodium chloride formed appear to be harmless. In addition, methyl alcohol dissolves sodium chloride slightly, thus tending to prevent separation of solid NaCl.

On the other hand, the reaction between calcium oxide and hydrochloric acid alone results in the formation of water, according to the following equation:

$$CaO + 2HCl \rightarrow CaCl_2 + H_2O$$

In practice, this means that much extra calcium oxide must be supplied to remove quickly the water of neutralization. Further, the calcium formed is corrosive, even under alkaline conditions.

The literature reports conflicting data concerning the reaction:

$$CH_3ONa + H_2O \rightleftarrows CH_3OH + NaOH$$

Published data indicates that the equilibrium point lies far to the left, but I have found that in refrigeration systems containing hydrocarbons, halogenated and otherwise, the reaction proceeds rapidly to the right, reaching equilibrium at very low water concentrations. This may be due, in part at least, to the fact that there is always some acid present with the moisture, which, by removing the alkali, would tend to let the reaction of water with the sodium methylate go towards completion. Whatever the reason, the methylate was found to react very thoroughly and to eliminate moisture practically completely. This action of the alcoholates might be likened to that of a buffer solution, since under these conditions they tend to keep the water content low regardless of the amount of water initially present provided the amounts of the reactants are within reasonable limits.

Solutions of various alcoholates in refrigerants of the methyl chloride or the dichlorodifluoromethane type have not been found in my tests to accelerate hydrolysis of the refrigerant. This is contrary to the general rule that basic reagents tend to accelerate hydrolysis of chlorinated hydrocarbons. Where such hydrolysis takes place, with methyl chloride, for example, the equation is:

$$CH_3Cl + H_2O \rightleftarrows CH_3OH + HCl$$

However, at the moderate temperatures which are encountered in a refrigeration system, say from 0° to 150° F., the hydrolysis is slow. Also, I have found that the presence of alcoholates still further slows down the hydrolysis in actual practice, even where considerable caustic soda is also present, possibly because their dehydrating properties result in the removal of water from the field of action, thereby throwing the foregoing equation to the left. For this, or some other reason, the alcoholates appear to counteract the effect of the caustic soda present which alone would tend to throw the reaction to the right.

Another advantage of my reagents over calcium oxide is clearly shown by the above. In a refrigeration system, where a large quantity of calcium oxide-hydroxide drier is used in an attempt to reach complete dehydration, the possibility of refrigerant hydrolysis is considerable, and these driers are customarily removed after a few weeks to avoid this and other troubles.

Although in the foregoing disclosure I have illustrated my invention by reference to sodium methylate, other alcoholates are satisfactory. Other alkali metals as potassium, lithium, or alkaline earth metals such as calcium, magnesium and the like may be used. Of the alkali metals, sodium is preferred because of its relative cheapness. The alkaline earth metal alcoholates, such as those of magnesium and calcium are not as satisfactory as those of the alkali metals because of their lower reactivity towards water. Further, the chlorides of the alkaline earth metals are much more corrosive than those of the alkali metals. Hence, while the alcoholates of the alkaline earth metals are efficient dehydrating and neutralizing agents, they are inferior in over-all performance to the alcoholates of the alkali metals.

In a similar manner instead of methyl alcohol other alcohols or hydroxy compounds may be used with the alkali metals to form alcoholates. The following have been tested and found to be suitable: Sodium ethylate, propylate and butylate, potassium ethylate. Ethylene and diethylene glycol form suitable alcoholates and so does glycerine. Aromatic alcoholates, such as sodium phenolate and benzylate alone or with methylate are usable but react less vigorously with water, and there is some possibility of undesirable side reactions. Sodium cyclohexanolate is useful chiefly in combination with sodium methylate. The alcoholates formed by dissolving sodium metal in such complex alcohols as ethylene glycol mono ethyl ether (2-ethoxy-ethanol) have been found very satisfactory. These alcoholates and other related ones were tested in refrigerating systems in solution in methyl alcohol in about the same proportions as the methylate already described.

Various solvents for the alcoholates may be used. I prefer to use enough solvent so that the resulting sodium alcoholate solution contains about 3% metallic sodium. Methyl alcohol is preferred as a solvent because a synthetic form is available which is of high purity and is extremely free from water, and is at the same time relatively inexpensive. Concentrations as high as 10% sodium metal may be used if desired, the upper limit being the solubility of the methylate in the methanol. Other alcohols may be used as solvents, including ethyl, propyl, butyl and other mono basic aliphatic alcohols, which are to be preferred to the di- and tri-basic alcohols of the same series. Butyl alcohol alone or mixed with methyl alcohol makes a solvent of superior blending ability. Cyclohexanol is still more valuable as a blending agent, preferably as a 5% or 10% mixture with methanol. 2-ethoxy ethanol ("cellosolve") alone is an excellent solvent with good blending properties. So also are the related compounds, ethylene glycol mono methyl and monobutyl ethers, and the similar diethylene glycol compounds. I use these glycols where it is desired to have a solvent of higher flash point.

The following mixtures have been given extensive practical tests and found to dehydrate and neutralize refrigerating systems effectively:

1. 3 parts by weight of sodium metal dissolved in 100 parts methyl alcohol.
2. 5 parts by weight of sodium metal dissolved in 95 parts methyl alcohol and five parts of butyl alcohol.
3. 5 parts by weight of sodium metal dissolved in 85 parts methyl alcohol, 5 parts butyl alcohol, and 10 parts cyclohexanol.
4. 3 parts by weight of sodium metal dissolved in 100 parts of 2-ethoxy ethanol.

These solutions are suitable for use in field or factory or to be mixed with refrigerant prior to use. One part solution to one hundred parts refrigerant is an average dose, although a higher or lower dosage may be used as needed.

Charging materials of the type described into old refrigerating systems or adding refrigerants containing such materials to old refrigerating systems effectively eliminates traces of acid which may be in such old equipment. This is of particular advantage where machinery, which has formerly contained sulphur-dioxide, is converted for use with a hydrocarbon refrigerant. Even thorough cleaning sometimes fails to remove the last traces of sulphur dioxide and its compounds, but the alcoholates easily reach to all parts of the system and neutralize any traces of remaining sulphur dioxide.

What is claimed is:

1. A refrigerant, comprising a volatile liquid of the type in which water is difficultly soluble and minor proportions of a metallic alcoholate and a solvent for the alcoholate miscible with the refrigerant to absorb any water and acid present.

2. A refrigerant, comprising a volatile liquid of the type in which water is difficultly soluble and a minor proportion of a metallic alcoholate mixed therewith to absorb any water and acid present.

3. A refrigerant, comprising a volatile liquid of the type in which water is difficultly soluble and a minor proportion of an alkali metal alcoholate dissolved in a solvent miscible with the refrigerant to absorb any water and acid present.

4. A refrigerant, comprising a volatile liquid consisting chiefly of a halogen derivative of a hydrocarbon and a minor proportion of an alkali metal alcoholate mixed therewith to absorb any water and acid present.

5. A refrigerant, comprising a volatile liquid of the type in which water is difficultly soluble and a minor proportion of a metallic alcoholate dissolved in alcohol to absorb any water and acid present.

6. A dehydrating and acid-neutralizing reagent for volatile refrigerants of the type in which water is difficultly soluble, comprising a solution of a metallic alcoholate in methyl alcohol and 2-ethoxy ethanol.

7. A refrigerant, comprising a major proportion of dichlorodifluoromethane and a minor proportion of a metallic alcoholate mixed therewith to absorb any water and acid present.

8. A dehydrating and acid-neutralizing reagent for volatile refrigerants of the type in which water is difficultly soluble, comprising a solution of a metallic alcoholate in a mixture of methyl alcohol to increase the solubility of the water in the refrigerant and an alcohol selected from the group consisting of butyl alcohol, cyclohexanol and 2-ethoxy ethanol, to aid the solution of the alcoholate in the lubricating oil used in the refrigerating system.

DAVID CRAMPTON.